(12) United States Patent  
Lane-Smith

(10) Patent No.: US 8,074,487 B2
(45) Date of Patent: Dec. 13, 2011

(54) METHOD OF CALIBRATING AN APPARATUS FOR MEASURING RADON AND/OR ITS PROGENY IN AN AIR SAMPLE

(75) Inventor: Derek R. Lane-Smith, Westford, MA (US)

(73) Assignee: Durridge Company Inc., Billerica, MA (US)

( * ) Notice: Subject to any disclaimer, the term of this patent is extended or adjusted under 35 U.S.C. 154(b) by 495 days.

(21) Appl. No.: 12/379,947

(22) Filed: Mar. 5, 2009

(65) Prior Publication Data
US 2010/0224769 A1 Sep. 9, 2010

(51) Int. Cl.
*G01N 21/00* (2006.01)
(52) U.S. Cl. ........................................................ 73/1.07
(58) Field of Classification Search ................... 73/1.07
See application file for complete search history.

(56) References Cited

U.S. PATENT DOCUMENTS

| | | | |
|---|---|---|---|
| 4,451,736 A | 5/1984 | Cameron | |
| 4,847,503 A | 7/1989 | Tetley et al. | |
| 4,868,386 A | 9/1989 | Ilmasti | |
| 4,977,318 A | 12/1990 | Ilmasti et al. | |
| 5,055,674 A | 10/1991 | Kotrappa | |
| 5,514,872 A | 5/1996 | Bolton et al. | |
| 5,834,628 A | 11/1998 | Hunter et al. | |
| 6,018,985 A | 2/2000 | Lane-Smith | |
| 6,255,652 B1* | 7/2001 | Moyer | 250/343 |
| 6,456,943 B1* | 9/2002 | Kogure et al. | 702/23 |
| 6,498,341 B2 | 12/2002 | Dehnert et al. | |
| 6,744,055 B2 | 6/2004 | Harley et al. | |
| 2004/0129890 A1 | 7/2004 | Berman et al. | |
| 2005/0132777 A1 | 6/2005 | Lane-Smith | |
| 2009/0014653 A1 | 1/2009 | Parrish | |
| 2009/0110022 A1* | 4/2009 | Snyder et al. | 374/1 |

FOREIGN PATENT DOCUMENTS

| | | |
|---|---|---|
| CA | 2196934 | 8/1998 |
| JP | 55-121171 A | 9/1980 |
| JP | 10-288670 A | 10/1998 |
| WO | WO 01/55709 A1 | 8/2001 |

OTHER PUBLICATIONS

PCT International Search Report and the Written Opinion in International App. No. PCT/US10/00425 (7 pp.).

(Continued)

*Primary Examiner* — Robert R Raevis
(74) *Attorney, Agent, or Firm* — Dinesh Agarwal, P.C.

(57) ABSTRACT

A method of calibrating an apparatus for measuring Radon and/or its progeny in an air sample, includes providing an apparatus for measuring Radon in an air sample that includes a preset offset voltage corresponding to a threshold conductivity value and a preselected reading value for indicating a concentration of Radon and/or its progeny, exposing the apparatus to a calibration area for measuring conductivity of the air therein, comparing the measured conductivity value of the air with the preset offset value for conductivity, and setting a lower threshold conductivity value and corresponding threshold reading value same as the preselected reading value, if the measured conductivity of the air is determined to be lower than the preset offset value for conductivity.

16 Claims, 2 Drawing Sheets

OTHER PUBLICATIONS

Gennaro, V. Development of calibration techniques for active and passive radon detectors. Thesis (online), 2007 (retrieved on Mar. 20, 2010) from Internet: http://www.fedoa.unina.it/1775/1/Venoso_Fisica_Fondamentale_ed_Applicata.pd (86 pgs).

Burkhart, J.F. "A Proposal to Set Up a Network of AARST Measurement Professionals to Act as First Responders in the Event of an Accidental or Purposeful Radioisotope Event", AARST 2003 International Radon Symposium, Nashville, Tennessee, Oct. 5-8, 2003( 8 pages).

Warrick, J. "Dirty Bomb Warheads Disappear", http://www.washingtonpost.com, Dec. 8, 2003 (5 pages).

Holloway, Robert W. and Liu, Chung-King, "Xenon-133 in California, Nevada, and Utah from the Chernobyl Accident" Environ Sci Technol., vol. 22, pp. 583-586, 1988.

Markson, R. et al. "Atmospheric Electrical Plume Detection: Theory and Field Measurements" Bull. Am. Meterol. Soc. vol. 60. No. 2, pp. 98-109, Feb. 1979.

* cited by examiner

METHOD OF CALIBRATING AN APPARATUS FOR MEASURING RADON AND/OR ITS PROGENY IN AN AIR SAMPLE

FIELD AND BACKGROUND OF THE INVENTION

The present invention is generally directed to measuring Radon concentration, and more particularly to a method for calibrating an apparatus for measuring Radon and/or its progeny in an air sample.

The deleterious effects of Radon and its progeny on living beings are well known. In this regard, it is recognized that exposure to radiation from Radon and its progeny is the second biggest cause of lung cancer, after smoking. It is also the biggest cause of death from the built environment in which Radon gas can diffuse out of the soil or concrete where they are formed and collect in spaces where people live and work. Various prior art methods and apparatus are available for measuring Radon concentration. One method and apparatus for measuring the concentration of unattached Radon progeny is disclosed in U.S. Pat. No. 6,018,985 (the '985 patent), by the same inventor, which is hereby incorporated herein in its entirety by reference. In the method disclosed in the '985 patent, the concentration of unattached Radon progeny in air is determined by measuring the conductivity of the air or the concentration of fast ions. A multiplying factor is used to convert the conductivity of air to obtain a value representing the concentration of the unattached Radon progeny in the air sample.

ASPECTS OF THE INVENTION

The present disclosure is directed to various aspects of the present invention.

One aspect of the present invention includes calibrating an apparatus for measuring Radon and/or its progeny in an air sample to accommodate for non-Radon-related radiation.

Another aspect of the present invention includes a method of calibrating an apparatus for measuring Radon and/or its progeny in an air sample to accommodate for any background cosmic radiation.

Another aspect of the present invention includes calibrating an apparatus for measuring Radon and/or its progeny in an air sample in a manner so as to detect or measure Radon even in a high cosmic radiation region, such as Denver, Colo.

Another aspect of the present invention includes a method of setting a lower threshold reading value in an apparatus for measuring Radon and/or its progeny in an air sample, which includes providing an apparatus for measuring Radon in an air sample that includes a preset offset voltage corresponding to a threshold conductivity value and a preselected reading value for indicating a concentration of Radon and/or its progeny, exposing the apparatus to a calibration area for measuring conductivity of the air therein, comparing the measured conductivity value of the air with the preset offset value for conductivity, and setting a lower threshold conductivity value and corresponding threshold reading value same as the preselected reading value if the measured conductivity of the air is determined to be lower than the preset offset value for conductivity.

Another aspect of the present invention includes a method of setting a minimum Radon reading value in an apparatus for measuring Radon and/or its progeny in an air sample, which includes providing an apparatus for measuring Radon in an air sample that includes a preset offset voltage corresponding to a conductivity value representing non-Radon-related radiation and a preselected reading value for indicating a concentration of Radon and/or its progeny, exposing the apparatus to open atmosphere for measuring conductivity of the ambient air, comparing the conductivity of the ambient air with the preset offset value for conductivity, and setting a minimum reading value same as the preselected reading value if the conductivity of the ambient air is determined to be lower than the preset offset value for conductivity.

BRIEF DESCRIPTION OF THE DRAWINGS

One of the above and other aspects, novel features and advantages of the present invention will become apparent from the following detailed description of the preferred embodiment(s) invention, as illustrated in the drawings, in which.

DETAILED DESCRIPTION OF THE PREFERRED EMBODIMENT(S) OF THE INVENTION

The present invention is based, in part, on the recognition and/or discovery that cosmic radiation is a significant source of ionization in the atmosphere and can affect the measurement of conductivity, and thus a measurement of Radon concentration in the air. It is further recognized that the intensity of cosmic radiation varies from place to place and from time to time. In this regard, it is also known that Radon concentration can never be negative and, in outside ambient air well above the ground level, is usually very low and can be taken as a reference low Radon concentration.

The concentration of Radon, and specifically its unattached progeny, is known to be a linear function of the conductivity (see, for example, the '985 patent). However, because of other ionizing radiation, such as cosmic rays, the relationship is not a simple proportionality and there is a zero intercept that represents the conductivity of air from all sources other than Radon and/or its progeny. This zero intercept needs to be deducted from the measured conductivity in order more accurately to calculate the contribution due to the presence of Radon and/or its progeny. In an apparatus for measuring the concentration of unattached Radon progeny, the conductivity measurement results in a voltage at the output of the first amplifier stage (see the '985 patent). The present invention is devised so the zero intercept becomes an offset voltage setting or zero offset that is deducted from a measured voltage before the conversion factor to translate the voltage to Radon concentration is applied.

Based, in part, on the foregoing recognitions and/or discoveries, one embodiment of a method of the present invention uses a voltage offset to eliminate or accommodate the effect of cosmic and/or other non-Radon-related radiation. This offset is adjusted automatically during the calibration procedure to prevent any reading from becoming negative or less than a preselected minimum or threshold reading value. In summary, the auto zero offset function adjusts or sets a lower threshold or minimum reading value in an apparatus for measuring the concentration of Radon and/or its progeny in an air sample, to accommodate variations in ambient cosmic and/or other non-Radon-related radiation.

Figure 1A:
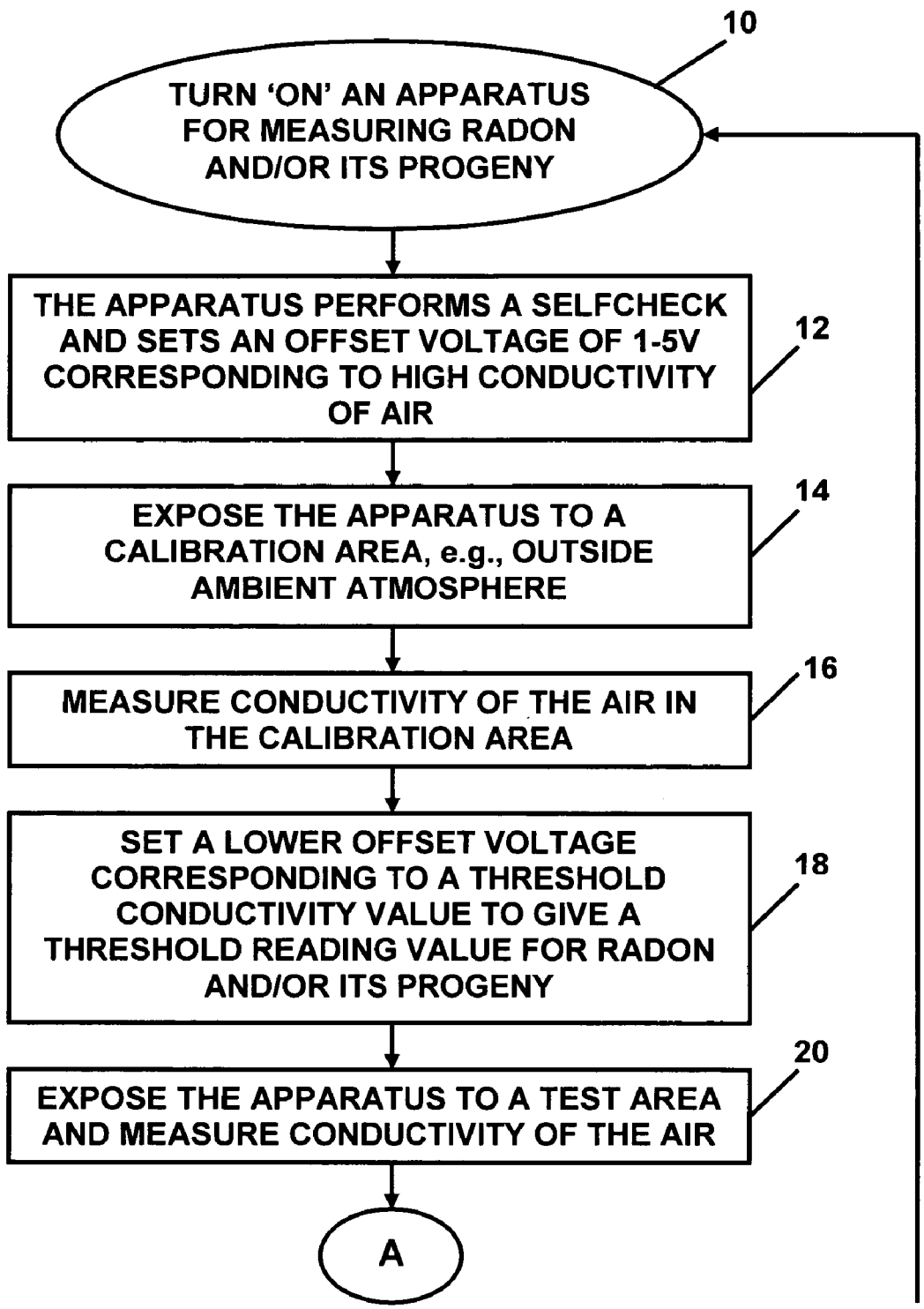
FIGS. 1A-1B illustrate a flow chart for executing a method for calibrating an apparatus for measuring Radon and/or its progeny in an air sample, in accordance with an embodiment of the invention.
Figure 1B:
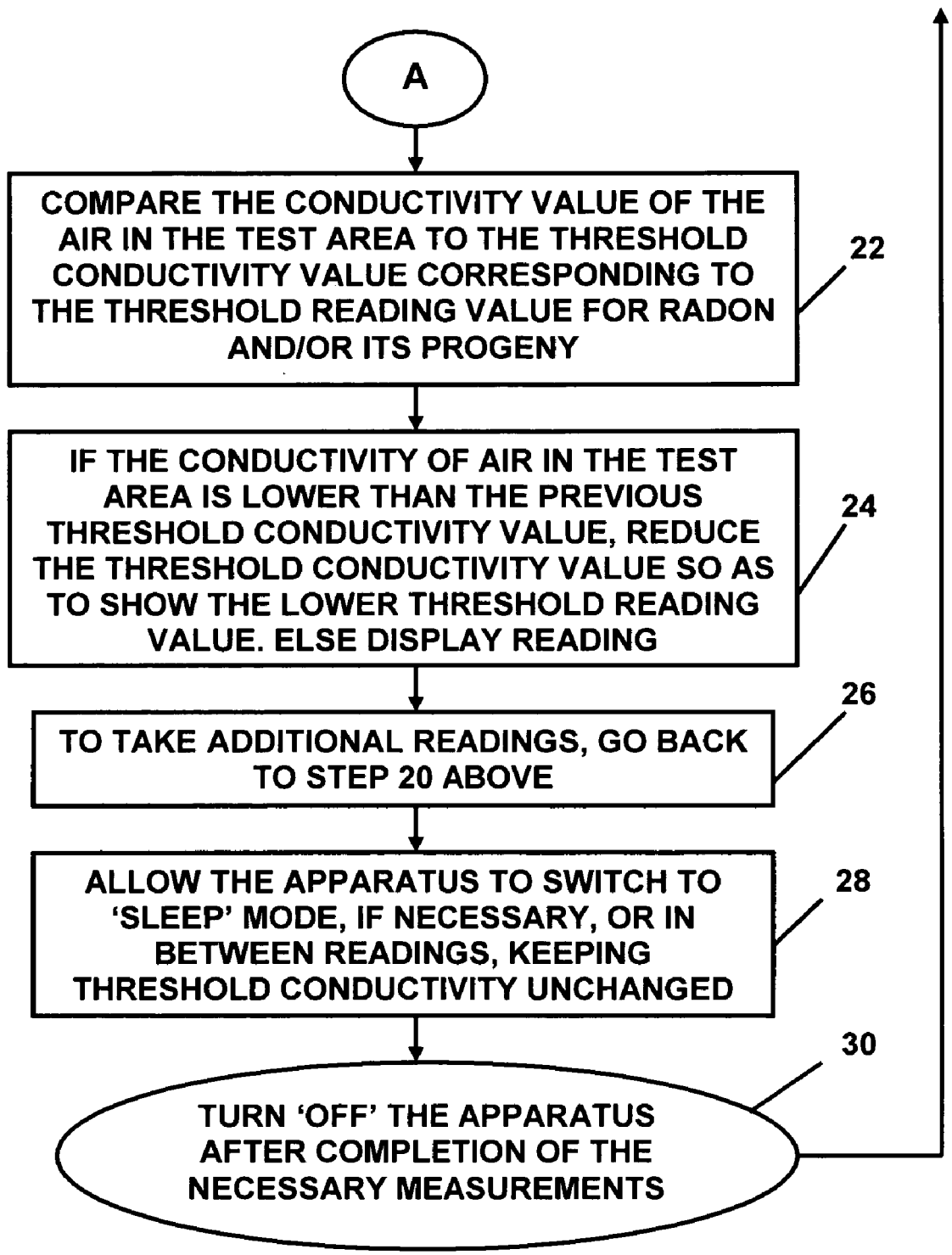

Referring to FIGS. 1A-1B, one embodiment of the method of the present invention will now be described. In order to calibrate an apparatus for measuring the concentration of Radon and/or progeny in an air sample, such as one disclosed in the '985 patent, a user would first turn the apparatus 'on' (step 10), which would perform a self-check and set a preselected offset voltage of about 1-5V, and preferably 3V (step 12). It is noted that this value of the offset voltage is chosen so as to accommodate high cosmic radiation activity.

The user would then expose the apparatus to an area where the Radon concentration is known or expected to be low, such as the outside ambient atmosphere (step 14). In the calibration area, the conductivity of the air is measured (step 16). It is noted herewith that the apparatus is set or programmed such that if after turning 'on', the first measurement reading of the conductivity is determined to be less than the offset conductivity value, corresponding to the offset voltage (step 12), the apparatus will set a lower offset voltage to give a threshold reading value of 0.1-0.5 pCi/L (step 18). In other words, any time a first reading of the conductivity is taken after turning the apparatus 'on', the apparatus will reduce the offset voltage and show the first reading to be equal to the preprogrammed or preselected low threshold reading value, preferably 0.1-0.5 pCi/L (it is noted that this range can be varied, as desired).

As a result of steps 10-18, the apparatus will show a lower threshold or minimum Radon concentration reading of 0.1-0.5 pCi/L, so long as the measured conductivity value is lower than the preset offset conductivity value corresponding to the offset voltage of about 1-5V, or 3V.

The user would then expose the apparatus to a location or area being tested to measure the conductivity of the air therein (step 20). If the conductivity measured in step 20, is higher than a threshold conductivity value that corresponds to the previously set lower threshold reading value (step 18), the apparatus will show a higher Radon concentration reading. On the other hand, if the conductivity of the air measured in step 20, is determined to be lower than the threshold conductivity value corresponding to the previously set lower threshold reading value (step 22), the apparatus will reduce the threshold conductivity value so as to show the new reading equal to the previously set lower threshold reading value (step 24).

In other words, once the lower threshold reading value has been set (step 18), the apparatus will show a lower threshold or minimum reading value of 0.1-0.5 pCi/L. However, if at any time a new conductivity measurement value is determined to be lower than the threshold conductivity value, then the apparatus will reduce the offset voltage to make a new lower threshold conductivity value and a new reading equal to the previously set lower threshold or minimum reading value.

The user may then take additional readings, as necessary (step 26) or allow the apparatus to switch to "sleep" mode (step 28). Once all the necessary measurements have been taken, the user will turn 'off' the apparatus (step 30). Once the apparatus is turned 'off', the threshold conductivity value, set in step 18, will preferably be lost and the user will need to allow the apparatus to perform steps 12-18, after turning the apparatus 'on'.

From the above, it can be observed that the method, in accordance with an embodiment of the invention, can be used to detect or measure low Radon concentrations even where cosmic and/or non-Radon-related radiation is high.

While this invention has been described as having preferred sequences, ranges, steps, materials, structures, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention.

What is claimed is:

1. A method of setting a lower threshold reading value in an apparatus for measuring Radon and/or its progeny in an air sample, comprising the steps of:
   a) providing an apparatus for measuring Radon in an air sample, the apparatus including a preset offset voltage corresponding to a threshold conductivity value and a preselected reading value for indicating a concentration of Radon and/or its progeny;
   b) exposing the apparatus to a calibration area for measuring conductivity of the air therein;
   c) comparing the measured conductivity value obtained in step b) with the preset offset value for conductivity; and
   d) setting a lower threshold conductivity value and corresponding threshold reading value same as the preselected reading value if the measured conductivity value in step c) is lower than the preset offset value for conductivity.

2. The method of claim 1, further comprising the steps of:
   e) exposing the apparatus to a test area for measuring conductivity of the air therein;
   f) comparing the measured conductivity value obtained in step e) with the threshold conductivity value corresponding to the lower threshold reading value set in step d); and
   g) reducing the threshold conductivity value so as to correspond to the lower threshold reading value if the measured conductivity value in step f) is lower than the previous threshold conductivity value.

3. The method of claim 1, wherein:
the preset offset voltage comprises about 1-5V.

4. The method of claim 1, wherein:
the preset offset voltage comprises about 3V.

5. The method of claim 1, wherein:
the preselected reading value comprises about 0.1-0.5 pCi/L.

6. The method of claim 1, wherein:
the preselected reading value comprises about 0.1-0.2 pCi/L.

7. The method of claim 1, wherein:
the calibration area comprises an area known to have a low Radon concentration.

8. The method of claim 1, wherein:
the calibration area comprises outside ambient atmosphere.

9. The method of claim 1, wherein:
the threshold conductivity value in step d) corresponds to a lower threshold reading value of about 0.1-0.5 pCi/L.

10. A method of setting a minimum Radon reading value in an apparatus for measuring Radon and/or its progeny in an air sample, comprising the steps of:
   a) providing an apparatus for measuring Radon in an air sample, the apparatus including a preset offset voltage corresponding to a conductivity value representing non-Radon-related radiation and a preselected reading value for indicating a concentration of Radon and/or its progeny;
   b) exposing the apparatus to open atmosphere for measuring conductivity of the ambient air;
   c) comparing the conductivity of the ambient air obtained in step b) with the preset offset value for conductivity; and d) setting a minimum reading value same as the preselected reading value if the conductivity of the ambient air in step c) is lower than the preset offset value for conductivity.

11. The method of claim 10, further comprising the steps of:
   e) exposing the apparatus to a test area for measuring conductivity of the air therein;
   f) comparing the conductivity of the test area air obtained in step e) with a threshold conductivity value corresponding to the minimum reading value set in step d); and
   g) reducing the threshold conductivity value so as to correspond to the minimum reading value if the conductivity of the test area air in step f) is lower than the previous threshold conductivity value.

12. The method of claim 11, wherein:
the threshold conductivity value in step f) corresponds to a minimum reading value of about 0.1-0.5 pCi/L.

13. The method of claim 10, wherein:
the preset offset voltage comprises about 1-5V.

14. The method of claim 10, wherein:
the preset offset voltage comprises about 3V.

15. The method of claim 10, wherein:
the preselected reading value comprises about 0.1-0.5 pCi/L.

16. The method of claim 10, wherein:
the preselected reading value comprises about 0.1-0.2 pCi/L.

* * * * *